United States Patent
Li et al.

(10) Patent No.: US 9,147,262 B1
(45) Date of Patent: Sep. 29, 2015

(54) METHODS AND SYSTEMS FOR IMAGE PROCESSING

(71) Applicant: Xerox Corporation, Norwalk, CT (US)

(72) Inventors: Xing Li, Webster, NY (US); Sainarayanan Gopalakrishnan, Chennai (IN); Rajasekar Kanagasabai, Chennai (IN)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/467,355

(22) Filed: Aug. 25, 2014

(51) Int. Cl.
  *G06K 9/00* (2006.01)
  *G06T 7/40* (2006.01)
  *H04N 1/405* (2006.01)
  *G06K 15/02* (2006.01)

(52) U.S. Cl.
  CPC ............ *G06T 7/408* (2013.01); *G06K 15/1881* (2013.01); *H04N 1/40018* (2013.01); *G06T 2207/10004* (2013.01); *G06T 2207/10024* (2013.01); *G06T 2207/20021* (2013.01)

(58) Field of Classification Search
  None
  See application file for complete search history.

(56) References Cited

U.S. PATENT DOCUMENTS

| | | | |
|---|---|---|---|
| 5,333,064 A * | 7/1994 | Seidner et al. | 358/3.08 |
| 5,583,659 A * | 12/1996 | Lee et al. | 358/3.13 |
| 6,172,770 B1 * | 1/2001 | Inoue | 358/3.06 |
| 6,229,923 B1 * | 5/2001 | Williams et al. | 382/224 |
| 6,734,991 B1 * | 5/2004 | Schweid | 358/3.06 |
| 6,750,984 B1 * | 6/2004 | Kanata et al. | 358/2.1 |
| 7,365,882 B2 | 4/2008 | Curry et al. | |
| 7,375,856 B2 * | 5/2008 | Curry et al. | 358/3.08 |
| 7,424,161 B2 | 9/2008 | Nakaya | |
| 7,773,776 B2 * | 8/2010 | Adachi | 382/112 |
| 8,345,310 B2 * | 1/2013 | Adachi | 358/3.06 |
| 2005/0179948 A1 * | 8/2005 | Curry et al. | 358/3.2 |
| 2006/0152765 A1 | 7/2006 | Adachi | |
| 2006/0164691 A1 * | 7/2006 | Adachi | 358/3.06 |
| 2006/0165285 A1 * | 7/2006 | Adachi | 382/173 |

* cited by examiner

*Primary Examiner* — Andrae S Allison (57) ABSTRACT

The disclosed embodiments illustrate methods and systems for image processing. The method includes dividing a portion of an image into a set of blocks, each block of which is divided into a set of sub-blocks. Thereafter, a measurable block is identified from the set of blocks based on a measurability criteria that comprises determining an average pixel value for each of the sub-blocks based on one or more pixels encompassed by respective sub-block. Further, a maximum average pixel value, a minimum average pixel value, and a range of average pixel values are determined among the set of sub-blocks. The measurability criteria further includes comparing the maximum average pixel value, the minimum average pixel value, and the range of average pixel values with respective pre-determined thresholds. The method further includes estimating a half-tone frequency of the portion based on a processing of the identified measurable block.

18 Claims, 5 Drawing Sheets

METHODS AND SYSTEMS FOR IMAGE PROCESSING

TECHNICAL FIELD

The presently disclosed embodiments are related, in general, to image processing. More particularly, the presently disclosed embodiments are related to methods and systems for estimating half-tone frequencies in the images.

BACKGROUND

Computing devices such as smart-phones, Personal Digital Assistants (PDAs), tablets, desktop computers, laptops, Multi-Functional Devices (MFDs), scanners, printers, etc., have become increasingly capable of performing complex image processing operations. For example, during scanning of the images, such computing devices may need to determine half-tone frequencies of different objects included in the images. Typically, the determination of the half-tone frequencies is performed by first determining the objects included in the images. Thereafter, each of the determined objects may be analyzed to determine the half-tone frequencies for the respective objects. However, such determination may be a time consuming process, and may require more computational power and higher costs.

SUMMARY

According to embodiments illustrated herein, there is provided a method for image processing. The method includes dividing a portion of an image into a set of blocks. Each block in the set of blocks is divided into a set of sub-blocks. The method further includes identifying, a measurable block, from the set of blocks, based on a measurability criteria. The measurability criteria comprises determining an average pixel value for each of the sub-blocks based on one or more pixels encompassed by respective sub-block. The measurability criteria further comprises determining a maximum average pixel value, a minimum average pixel value, and a range of average pixel values among the set of sub-blocks, based on the average pixel value for each of the sub-blocks. The measurability criteria further comprises comparing the maximum average pixel value, the minimum average pixel value, and the range of average pixel values with respective pre-determined thresholds. The method further includes estimating a half-tone frequency of the portion based on a processing of the identified measurable block.

According to embodiments illustrated herein, there is provided a system for image processing. The system includes one or more processors that are operable to divide a portion of an image into a set of blocks. Each block in the set of blocks is divided into a set of sub-blocks. Thereafter, a measurable block, from the set of blocks, is identified, based on a measurability criteria. The measurability criteria comprises determining an average pixel value for each of the sub-blocks based on one or more pixels encompassed by respective sub-block. The measurability criteria further comprises determining a maximum average pixel value, a minimum average pixel value, and a range of average pixel values among the set of sub-blocks, based on the average pixel value for each of the sub-blocks. The measurability criteria further comprises comparing the maximum average pixel value, the minimum average pixel value, and the range of average pixel values with respective pre-determined thresholds. The one or more processors are further configured to estimate a half-tone frequency of the portion based on a processing of the identified measurable block.

According to embodiments illustrated herein, there is provided a computer program product for use with a computing device. The computer program product comprises a non-transitory computer readable medium, the non-transitory computer readable medium stores a computer program code for image processing. The computer readable program code is executable by one or more processors in the computing device to divide a portion of an image into a set of blocks. Each block in the set of blocks is divided into a set of sub-blocks. Thereafter, a measurable block, from the set of blocks, is identified, based on a measurability criteria. The measurability criteria comprises determining an average pixel value for each of the sub-blocks based on one or more pixels encompassed by respective sub-block. The measurability criteria further comprises determining a maximum average pixel value, a minimum average pixel value, and a range of average pixel values among the set of sub-blocks, based on the average pixel value for each of the sub-blocks. The measurability criteria further comprises comparing the maximum average pixel value, the minimum average pixel value, and the range of average pixel values with respective pre-determined thresholds. The computer program code is further executable by the one or more processors to estimate a half-tone frequency of the portion based on a processing of the identified measurable block.

BRIEF DESCRIPTION OF DRAWINGS

The accompanying drawings illustrate the various embodiments of systems, methods, and other aspects of the disclosure. Any person with ordinary skills in the art will appreciate that the illustrated element boundaries (e.g., boxes, groups of boxes, or other shapes) in the figures represent one example of the boundaries. In some examples, one element may be designed as multiple elements, or multiple elements may be designed as one element. In some examples, an element shown as an internal component of one element may be implemented as an external component in another, and vice versa. Furthermore, the elements may not be drawn to scale.

Various embodiments will hereinafter be described in accordance with the appended drawings, which are provided to illustrate the scope and not to limit it in any manner, wherein like designations denote similar elements, and in which.

DETAILED DESCRIPTION

The present disclosure is best understood with reference to the detailed figures and description set forth herein. Various embodiments are discussed below with reference to the figures. However, those skilled in the art will readily appreciate that the detailed descriptions given herein with respect to the figures are simply for explanatory purposes as the methods and systems may extend beyond the described embodiments. For example, the teachings presented and the needs of a particular application may yield multiple alternative and suitable approaches to implement the functionality of any detail described herein. Therefore, any approach may extend beyond the particular implementation choices in the following embodiments described and shown.

References to "one embodiment", "at least one embodiment", "an embodiment", "one example", "an example", "for example", and so on, indicate that the embodiment(s) or example(s) may include a particular feature, structure, characteristic, property, element, or limitation, but that not every embodiment or example necessarily includes that particular feature, structure, characteristic, property, element, or limitation. Furthermore, repeated use of the phrase "in an embodiment" does not necessarily refer to the same embodiment.

Definitions: The following terms shall have, for the purposes of this application, the meanings set forth below.

A "computing device" refers to a device that includes a processor/microcontroller and/or any other electronic component, or a device or a system that performs one or more operations according to one or more programming instructions. In an embodiment, the computing device has an associated display that may be utilized for displaying one or more images. Examples of the computing device may include, but are not limited to, a desktop computer, a laptop, a PDA, a mobile device, an MFD, a smartphone, a tablet computer (e.g., iPad®, Samsung Galaxy Tab®), and the like.

A "Multi-Function Device" (MFD) refers to a computing device that can perform multiple functions. Examples of the functions may include, but are not limited to, printing, scanning, copying, faxing, emailing, and the like. In an embodiment, the MFD includes a scanner and a printer for scanning and printing one or more documents, respectively. In an embodiment, the MFD has communication capabilities that enable the MFD to send/receive data and messages in accordance with one or more communication protocols such as, but not limited to, HTTP, FTP, WebDAV, E-mail, SMB, NFS, and TWAIN.

An "image" refers to an electronic file containing content such as text, pictures, and meta-data information such as, but not limited to, a file-format/type, a compression/encryption scheme usable for compressing/encrypting the content, a creation/access timestamp, and so on. In an embodiment, the image may be represented using one or more color schemes such as but not limited to, RGB (Red-Green-Blue), HSV (Hue-Saturation-Value), YCbCr, Gray Scale, and so on.

A "portion of an image" refers to a region of interest within an image, on which one or more image processing operations are to be performed. In an embodiment, the portion of the image may be selected by a user. In another embodiment, the portion of the image may be determined heuristically. In an embodiment, the portion of the image may comprise one or more image objects. Further, the one or more objects may encompass one or more connected/partially connected region. In an embodiment, the one or more objects may comprise one or more image features such as, but not limited to, one or more edges, one or more ridges, one or more contours, and so on. In an embodiment, the image object in the portion of the image may be determined by utilizing one or more image analysis techniques known in the art such as, but not limited to, a connected component analysis, or a windowing-based image feature extraction analysis.

A "block" refers to a set of pixels in a portion of an image, which are analyzed together during an image processing operation. In an embodiment, the portion of the image may be divided into a set of blocks for performing one or more image processing operations.

An "average" refers to any mathematical operation in which multiple data values are caused to be effectively summarized, for any purpose, as a single data value. For example, an average may correspond to, but is not limited to, a rolling average, a weighted average, a median, a mode, or any result of any applied mathematical or statistical techniques.

A "pixel value" refers to an intensity associated with a particular pixel. In an embodiment, the intensity may be within a pre-determined range based on the type of the image. For example, each pixel of an 8-bit gray scale image may have a pixel value within the range of 0 to 255.

A "measurability criteria" refers to a set of conditions against which a block may be evaluated to determine whether the block should be selected for further processing. In an embodiment, the measurability criteria has one or more associated predetermined thresholds. For example, the one or more predetermined thresholds may correspond to a minimum, a maximum, or an average pixel value for pixels included in the block being checked for the measurability criteria. In an embodiment, the one or more predetermined thresholds may be provided as a user-input. Alternatively, the one or more predetermined thresholds may correspond to programmable parameters associated with the processing of the image.

Figure 1:
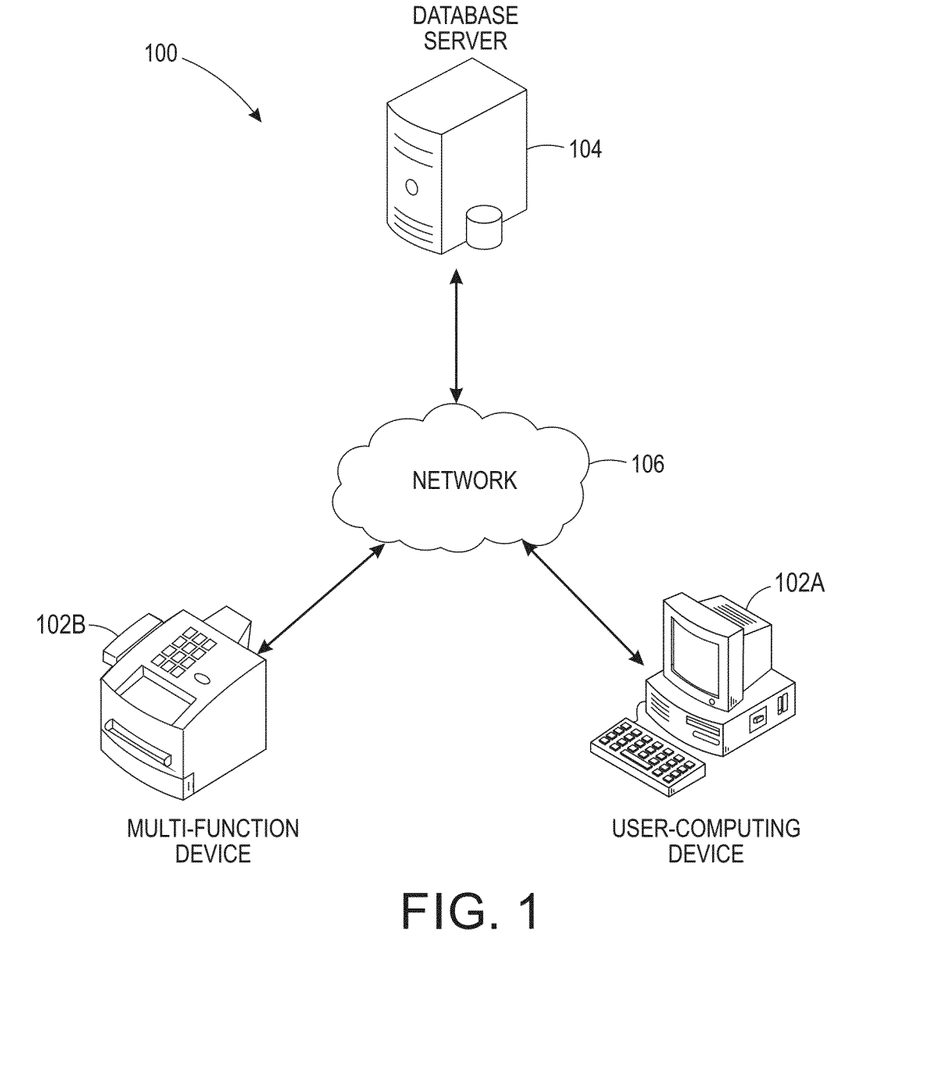
FIG. 1 is a block diagram illustrating a system environment in which various embodiments may be implemented.

FIG. 1 is a block diagram illustrating a system environment 100 in which various embodiments may be implemented. The system environment 100 includes user-computing device 102a, an MFD 102b, a database server 104, and a network 106. Various devices in the system environment 100 (e.g., the user-computing device 102a, the MFD 102b, and the database server 104) may be interconnected over the network 106.

The user-computing device 102a refers to a computing device used by a user. In an embodiment, using the user-computing device 102a, the user may provide inputs for processing an image. For example, the user may provide an input to select a portion of the image for processing. Further, the user may provide inputs corresponding to pre-determined threshold values for a measurability criteria. In an embodiment, the pre-determined threshold values may include the maximum value of the pixels that may be utilized while processing the image. In an embodiment, the user may provide such values to indicate which blocks in the image need to be processed for half-tone frequency estimation. In a similar way, the user may provide inputs corresponding to minimum/average values of the pixels. The user may provide the inputs using the input devices (e.g., keyboard, computer-mouse, and touch interface) associated with the user-computing device 102a. In an embodiment, the user-computing device 102a may have an associated display that may be utilized for displaying processed image.

In an embodiment, the user-computing device 102a may be also utilized for accessing the MFD 102b over the network 106. Further, the user may provide various types of inputs, as disclosed above, by accessing the MFD 102b. For example, the user may provide inputs through an interface provided by the MFD 102b. In an embodiment, the user-computing device 102a may correspond to various types of computing devices, such as, but not limited to, a desktop computer, a laptop, a PDA, a mobile device, a smartphone, a tablet computer (e.g., iPad®, Samsung Galaxy Tab®), and the like.

The MFD 102b refers to a computing device that may process the image. In an embodiment, the processing of the image may correspond to an estimation of half-tone frequency of the portion of the image. To that end, in an embodiment, the MFD 102b may divide the portion of the image into a set of blocks. Further, each block in the set of blocks may be divided into a set of sub-blocks. Thereafter, the MFD 102b may determine whether a block, from the set of blocks, is a measurable block. The MFD 102b may determine measurability of the block based on a measurability criteria. In an embodiment, the measurability criteria comprises determining an average pixel value for each of the sub-blocks based on one or more pixels encompassed by respective sub-block. Further, a maximum average pixel value, a minimum average pixel value, and a range of average pixel values are determined among the set of sub-blocks, based on the average pixel value for each of the sub-blocks. The measurability criteria further includes comparing the maximum average pixel value, the minimum average pixel value, and the range of average pixel values with respective pre-determined thresholds (e.g., received from the user). Based on the determination of the block for its measurability, the MFD 102b may determine the half-tone frequency for that block. Further details about the processing of the image to estimate the half-tone frequencies have been discussed in conjunction with FIG. 3. In an embodiment, the MFD 102b may include various types of computing devices, such as, but not limited to, printers, scanners, copiers, fax-machines, desktop computers, laptops, PDAs, smartphones, mobile devices, tablet computers, and the like.

A person having ordinary skill in the art would understand that the scope of the disclosure is not limited to the MFD 102b for processing the image. In an embodiment, the user-computing device 102a may process the image, without departing from the scope of the disclosure. For example, the user-computing device 102a (e.g., a mobile phone) may process the image to determine halftone frequencies associated with different portions of the image (e.g., selected by user), and subsequently the user-computing device 102a may share the determined halftone frequencies with the MFD 102b for further processing (e.g., printing).

The database server 104 refers to a computing device that may store the image. In an embodiment, the database server 104 may store various types of meta-data information associated with the image. Examples of the meta-data information may include, but is not limited to, a file-format/type, a compression/encryption scheme usable for compressing/encrypting the content, a creation/access timestamp, and so on. In an embodiment, the database server 104 may store pre-determined values usable for the image processing operations. For example, the database server 104 may store one or more mapping tables defining the relationship between locations of peak frequency components associated with one or more measurable blocks (when transformed in the frequency domain) and a corresponding half-tone frequency associated with the portion of the image. Further, the database server 104 may store the pre-determined thresholds corresponding to the measurability criteria. In an embodiment, the database server 104 may store a mapping between different users and the respective pre-defined threshold values provided by the users. In an embodiment, the database server 104 may receive a query from the user-computing device 102a and/or the MFD 102b for retrieving various types of information stored in the database server 104. For querying the database server 104, one or more querying languages may be utilized such as, but not limited to, SQL, QUEL, DMX and so forth. Further, the database server 104 may be realized through various technologies such as, but not limited to, Microsoft® SQL server, Oracle, and My SQL. In an embodiment, the database server 104 may connect to the user-computing device 102a and/or MFD 102b, using one or more protocols such as, but not limited to, ODBC protocol and JDBC protocol.

It will be apparent to a person skilled in the art that the functionalities of the database server 104 may be incorporated into the MFD 102b, without departing from the scope of the disclosure. In such a scenario, various types of information, as disclosed above, may be stored in the MFD 102b.

The network 106 corresponds to a medium through which content and messages flow between various devices of the system environment 100 (e.g., the user-computing device 102a, the MFD 102b, and the database server 104). Examples of the network 106 may include, but are not limited to, a Wireless Fidelity (Wi-Fi) network, a Wide Area Network (WAN), a Local Area Network (LAN), or a Metropolitan Area Network (MAN). Various devices in the system environment 100 can connect to the network 106 in accordance with various wired and wireless communication protocols such as Transmission Control Protocol and Internet Protocol (TCP/IP), User Datagram Protocol (UDP), and 2G, 3G, or 4G communication protocols.

Figure 2:
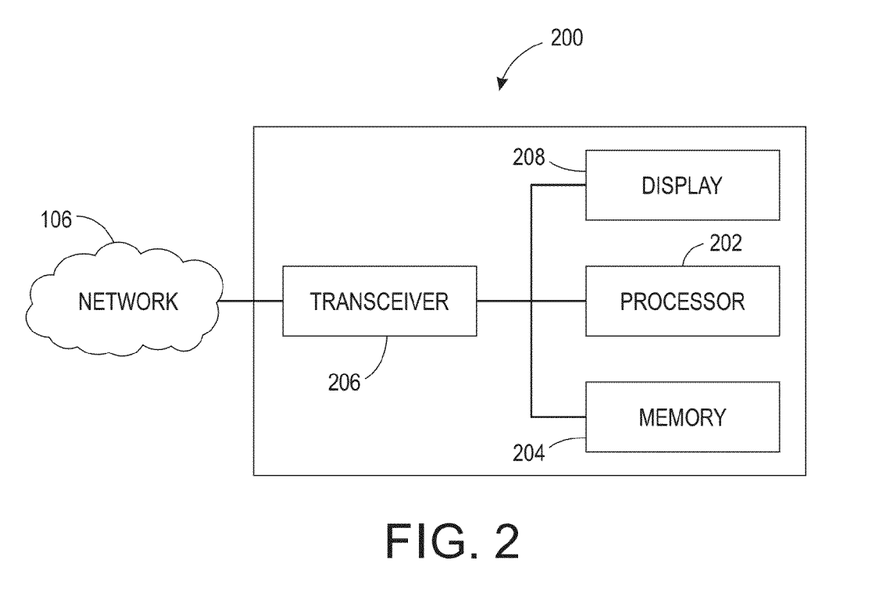
FIG. 2 is a block diagram illustrating a computing device, in accordance with at least one embodiment.

FIG. 2 is a block diagram illustrating a computing device 200, in accordance with at least one embodiment. The computing device 200 may correspond to at least one of the user-computing device 102a or the MFD 102b. In an embodiment, the computing device 200 includes a processor 202, a memory 204, a transceiver 206, and a display 208.

The processor 202 is coupled to the memory 204, the transceiver 206, and the display 208. The processor 202 includes suitable logic, circuitry, and/or interfaces that are operable to execute one or more instructions stored in the memory 204 to perform pre-determined operation. The memory 204 may be operable to store the one or more instructions. The processor 202 may be implemented using one or more processor technologies known in the art. Examples of the processor 202 include, but are not limited to, an x86 processor, a RISC processor, an ASIC processor, a CISC processor, or any other processor.

The memory 204 stores a set of instructions and data. Some of the commonly known memory implementations include, but are not limited to, a Random Access Memory (RAM), a Read Only Memory (ROM), a Hard Disk Drive (HDD), and a Secure Digital (SD) card. Further, the memory 204 includes the one or more instructions that are executable by the processor 202 to perform specific operations. It will be apparent to a person having ordinary skill in the art that the one or more instructions stored in the memory 204 enables the hardware of the computing device 200 to perform the predetermined operation.

The transceiver 206 transmits and receives messages and data to/from various components of the system environment 100. Examples of the transceiver 206 may include, but are not limited to, an antenna, an Ethernet port, an USB port or any other port that can be configured to receive and transmit data. The transceiver 206 transmits and receives data/messages in accordance with various communication protocols, such as, TCP/IP, UDP, and 2G, 3G, or 4G communication protocols.

The display 208 facilitates the user to view information presented on the computing device 200. For example, the user may view the images on the display 208. The display 208 may be realized through several known technologies, such as Cathode Ray Tube (CRT) based display, Liquid Crystal Display (LCD), Light Emitting Diode (LED) based display, Organic LED based display, and Retina display®technology. In an embodiment, the display 208 can be a touch screen that is operable to receive a user-input.

Figure 3:
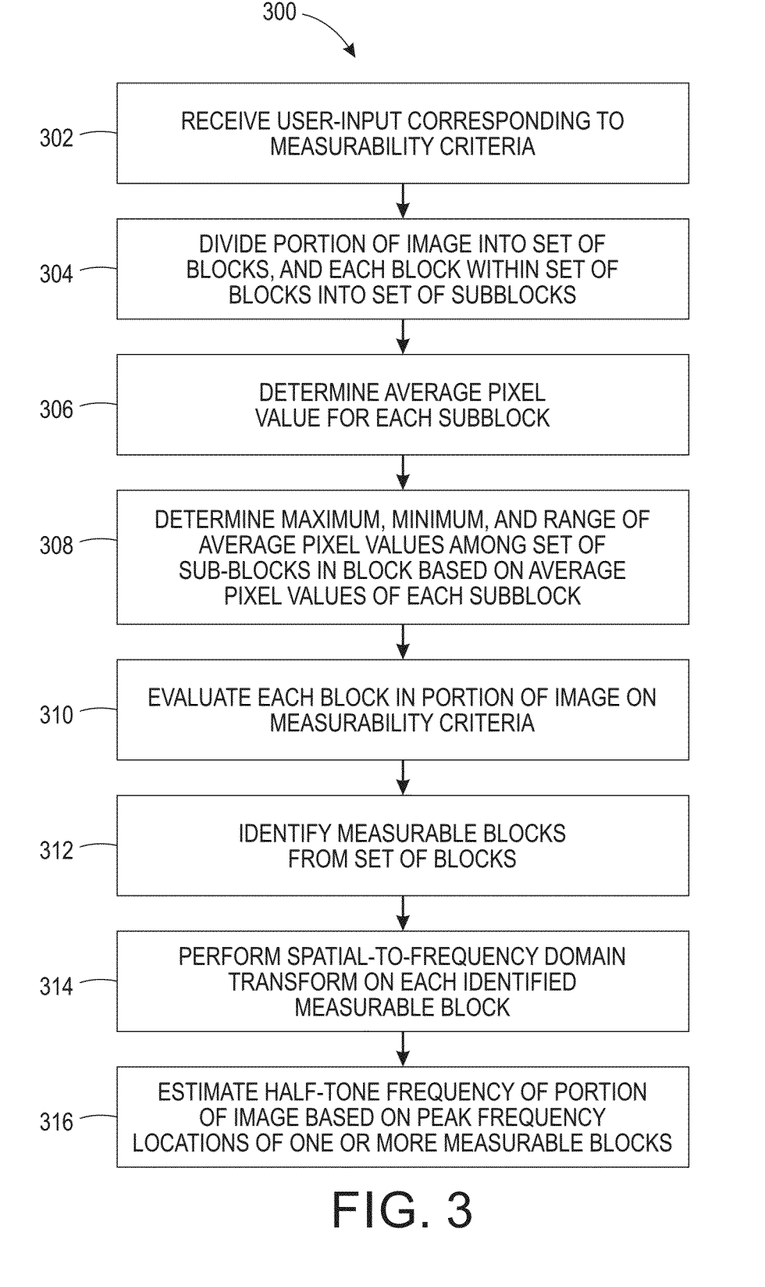
FIG. 3 is a flowchart illustrating a method for image processing, in accordance with at least one embodiment.

An embodiment of the operation of the computing device 200 for processing of the image has been described in conjunction with FIG. 3. For the purpose of the ongoing description the computing device 200 has been considered as the MFD 102b, however, a person skilled in the art would appreciate that the scope of the disclosure is not restricted to the computing device 200 as the MFD 102b. In an embodiment, the computing device 200 may be realized as the user-computing device 102a.

FIG. 3 is a flowchart 300 illustrating a method for processing the image, in accordance with at least one embodiment. The flowchart 300 is described in conjunction with FIG. 1 and FIG. 2.

At step 302, a user-input corresponding to the measurability criteria is received. In an embodiment, the processor 202 is configured to receive the user-input corresponding to the measurability criteria. In an embodiment, a user of the user-computing device 102a may provide the user-input through a user-interface presented on the user-computing device 102a. In an embodiment, the user-input may comprise one or more parameters associated with the measurability criteria, which may be utilized by the processor 202 to check whether a block has to be processed further. In an embodiment, the one or more parameters may correspond to, but are not limited to, maximum average pixel value, minimum average pixel value, and range of average pixel values. Table 1 illustrates an example of values of the one or more parameters:

TABLE 1

Example of values of the programmable parameters

| Parameter | Value |
|---|---|
| (Minimum average pixel value) L | 55 |
| (Maximum average pixel value) H | 215 |
| (Range of average pixel value) R | 120 |

As is evident from Table 1, a value of 55 may be specified for the parameter "minimum average pixel value" (denoted by "L") for a block being evaluated for measurability. Similarly, values 215 and 120 may be specified for the parameters "minimum average pixel value" and "range of average pixel values" (denoted by "H" and "R", respectively). The evaluation of blocks for measurability has been further elaborated in conjunction with step 312.

A person skilled in the art would appreciate that the one or more parameters corresponding to the measurability criteria may not be as such provided by the user, without departing from the scope of the disclosure. In an embodiment, values of the one or more parameters may be provided by a software that processes the image. Further, in an embodiment, the values of the one or more parameters may be provided before the processing of the image begins.

In an embodiment, the user-input received from the user of the user-computing device 102a may include a selection of the portion of the image. For example, through a user-interface of the user-computing device 102a, the user may select a region in the image as the portion of the image to be processed. In an alternate embodiment, the processor 202 may automatically determine the portion of the image, without explicit user-input.

In an embodiment, the portion of the image may include one or more image objects, which may be identified within the image based on one or more image processing techniques such as, but not limited to, connected component analysis, windowing based image object extraction, and so on. The one or more objects may comprise one or more image features such as, but not limited to, one or more edges, one or more ridges, one or more contours, and so on.

In an embodiment, the user of the computing-device 102a may be presented with an option to select a set of image objects of interest from the one or more image objects as the portion of the image.

At step 304, the portion of the image is divided into a set of blocks. In an embodiment, each of the blocks in the set of blocks is further divided into a set of sub-blocks. The processor 202 is configured to divide the portion of the image into the set of blocks and the set of blocks further into the set of sub-blocks.

For example, the processor 202 may divide the portion of the image into N×N blocks. Further, the processor 202 may divide each block, from N×N blocks, into M×M sub-blocks. In an embodiment, the values of M and N may be provided the user. In an alternate embodiment, the processor 202 may automatically determine the values of M and N. Further illustrations of the division of the portion of the image into different blocks and sub-blocks has been discussed in conjunction with the FIG. 4.

At step 306, an average pixel value is determined for each sub-block within the block. In an embodiment, the processor 202 is configured to determine the average pixel value for each sub-block based on the pixels encompassed in the respective sub-block. For example, the image is divided into N×N blocks and each of the N×N block is further divided into M×M sub-blocks. If a sub-block encompasses 'X' pixels, then the processor 202 may determine the average pixel value of these 'X' pixels as the average pixel value of the sub-block. In an embodiment, the processor 202 may utilize the following equation to determine the average pixel value of each sub-block:

$$\text{Avg}(SB_i) = \frac{\sum_{j=1}^{j=X} P_{ij}}{X} \quad (1)$$

where,
Avg ($SB_i$): Average pixel value of $i^{th}$ sub-block, $SB_i$,
$P_{ij}$: Pixel value of $i^{th}$ pixel within the $i^{th}$ sub-block, $SB_i$, and
X: Number of pixels within the $i^{th}$ sub-block, $SB_i$.

In an embodiment, the pixel value of each pixel may correspond to the intensity value of the particular pixel. A person skilled in the art would understand that the scope of the disclosure is not limited determining the average pixel value using equation 1. Any mathematical operation in which multiple data values are manipulated to obtain one or more values may be used for determining the average pixel value, without departing from the spirit of the disclosure. For example, the term average may correspond to, but is not limited to, rolling average, weighted average, a median, a mode, and the like. Further, a person skilled in the art would appreciate that the one or more mathematical operations, as discussed above, may be applied to the values of the pixels encompassed within the sub-block in any color space known in the art such as, but not limited to, RGB (Red-Green-Blue), HSV (Hue-Saturation-Value), $YC_bC_r$, Gray Scale, and so on.

At step 308, a minimum average pixel value, a maximum average pixel value, and a range of average pixel values, among the set of sub-blocks within each block is determined based on average pixel values of each sub-block. In an embodiment, the processor 202 is configured to determine the minimum average pixel value, the maximum average pixel value, and the range of average pixel values.

For example, a block $B_i$ in the portion of the image contains four sub-blocks $SB_1$, $SB_2$, $SB_3$, and $SB_4$ In such a scenario, the processor 202 may determine the minimum average pixel value for the block B, as:

$$\text{Min}(B_i)=\text{Min}\{\text{Avg}(SB_1),\text{Avg}(SB_2),\text{Avg}(SB_3),\text{Avg}(SB_4)\} \quad (2)$$

where,

Min ($B_i$): Minimum average pixel value for the block $B_i$, and

Avg ($SB_j$): Average pixel value of $j^{th}$ sub-block (where j=1-4).

Similarly, the processor 202 may determine the maximum average pixel value for the block $B_i$ as:

$$\text{Max}(B_i)=\text{Max}\{\text{Avg}(SB_1),\text{Avg}(SB_2),\text{Avg}(SB_3),\text{Avg}(SB_4)\} \quad (3)$$

where,

Max ($B_i$): Maximum average pixel value for the block $B_i$, and

Avg ($SB_j$): Average pixel value of $j^{th}$ sub-block (where j=1-4).

Further, the processor 202 may determine the range of average pixel values for the block $B_i$ as:

$$\text{Range}(B_i)=\text{Max}(B_i)-\text{Min}(B_i) \quad (4)$$

where,

Range ($B_i$): Range of average pixel values for the block $B_i$,

Max ($B_i$): Maximum average pixel value for the block $B_i$, and

Min ($B_i$): Minimum average pixel value for the block $B_i$.

At step 310, each block in the portion of the image is evaluated on the measurability criteria. In an embodiment, the processor 202 is configured to evaluate each block on the measurability criteria. In an embodiment, a block being checked on the measurability criteria is evaluated on a set of pre-determined conditions. In an embodiment, the pre-determined conditions may be specified by the user through the user-interface provided on the user-computing device 102a. Alternatively, the pre-determined conditions may be determined heuristically by the processor 202. In an embodiment, the pre-determined conditions for the evaluation of a block on the measurability criteria may be represented by following set of equations:

$$\text{Min}(B_i) \geq L \quad (5)$$

$$\text{Max}(B_i) \leq H \quad (6)$$

$$\text{Range}(B_i) \leq R \quad (7)$$

where, the values for Min ($B_i$), Max ($B_i$), and Range ($B_i$) may be determined using the equations (2)-(4), and values for the parameters L, H, and R may be provided by the user, as discussed above.

At step 312, measurable blocks are identified from the set of blocks. In an embodiment, the processor 202 may identify measurable blocks from the set of blocks within the portion of the image. In an embodiment, the processor 202 may label such measurable blocks for further processing.

At step 314, a spatial-to-frequency domain transform is performed on each identified measurable block. In an embodiment, the processor 202 is configured to perform the spatial-to-frequency domain transform. In an embodiment, the spatial-to-frequency domain transform may correspond to a Fast Fourier Transform (FFT). Thus, each identified measurable block is transformed from the spatial domain to the frequency domain.

A person skilled in the art would appreciate that any known image processing technique may be used to perform the spatial-to-frequency domain transform without departing from the scope of the disclosure.

At step 316, half-tone frequency of the portion of the image is estimated based on peak frequency locations of one or more measurable blocks. In an embodiment, the processor 202 is configured to estimate the half-tone frequency of the portion of the image. In an embodiment, the processor 202 first determines the location of peak frequency components in the frequency domain for each identified measurable block. Thereafter, the processor 202 may utilize a mapping table that includes a mapping between the location of peak frequency components and the half-tone frequency corresponding to that peak frequency location. In an embodiment, such mapping may be provided as a user-input. As discussed above, the processor 202 may retrieve the mapping table from the database server 104. The following table illustrates one such mapping table that shows a mapping of peak locations in frequency domain and corresponding half-tone frequencies:

TABLE 2

An example of a mapping table between peak locations in frequency domain and corresponding half-tone frequencies

| Peak location | Frequency cycles | Estimated half-tone frequency |
| --- | --- | --- |
| (4,3) | 5.00 | 85 LPI (color)/100 LPI (gray) |
| (7,1) | 7.07 | 133 LPI (color)/133 LPI (gray) |
| (8,1) | 8.06 | 150 LPI (color)/143 LPI (gray) |
| (8,6) | 10.00 | 175 LPI (color)/162 LPI (gray) |

As evident from the first row of Table 2, the peak location of (4, 3) in frequency domain corresponds to 5.00 frequency cycles (i.e., $(4^2+3^2)^{1/2}$) which is the distance of the point (4, 3) from the frequency domain origin (0, 0). Further, 5 frequency cycles correspond to an estimated half-tone frequency of 85 LPI (for color) and 100 LPI (for gray scale). Similarly, the second row illustrates the mapping between the peak location (7, 1) and an estimated half-tone frequency of 133 LPI (for both color and gray scale) with 7.07 frequency cycles, and so on.

In an embodiment, based on the determined half-tone frequencies for each of the blocks included in the portion of the image, the processor 202 may determine half-tone frequency for that portion. For example, the processor 202 may determine an average value of the half-tone frequencies of different measurable blocks included in the portion of the image to determine the half-tone frequency value for that portion. Thereafter, the processor 202 may assign this average value as the half-tone frequency value of the portion of the image. In an embodiment, the processor 202 may determine the average value of the half-tone frequencies for a pre-determined number of measurable blocks (e.g., provided through user-input) in the portion of the image to determine the half-tone frequency of the portion. For example, the processor 202 estimates the half-tone frequency of four measurable blocks in the portion of the image as 100 LPI, 120 LPI, 80 LPI, and 140 LPI. Thereafter, the processor 202 determines the half-tone frequency of the portion of the image as 110 LPI (i.e., (100+120+80+140)/4). A person skilled in the art would appreciate that any known statistical technique may be utilized to determine the half-tone frequency of the portion of the image based on the estimated half-tone frequencies of the measurable blocks. For example, as discussed above, the half-tone frequency of the portion of the image may be determined using one or more statistical techniques such as, but not limited to, rolling average of half-tone frequencies of measurable blocks, weighted average of half-tone frequencies of measurable blocks, a median of half-tone frequencies of measurable blocks, a mode of half-tone frequencies of measurable blocks, and the like.

In another embodiment, the processor 202 may determine the half-tone frequency value of the portion of image based on a predetermined number (e.g., provided through user-input) of half-tone frequencies of the consecutive measurable blocks with same value. For example, if the half-tone frequency of three consecutive measurable blocks is estimated as 100 LPI, the processor 202 may determine the half-tone frequency of the portion of the image as 100 LPI.

In an embodiment, the identification of measurable blocks (refer to step 312) and the estimation of the half-tone frequency of the blocks (refer to step 318) may be parallelized. Thus, a first processor may evaluate the measurability criteria on a first set of blocks that are within a first portion of the image, while a second processor may estimate the half-tone frequency of the measurable blocks identified in a second portion of the image. In this way, the time consumed for determining the half-tone frequency for the complete image may be reduced.

Figure 4:
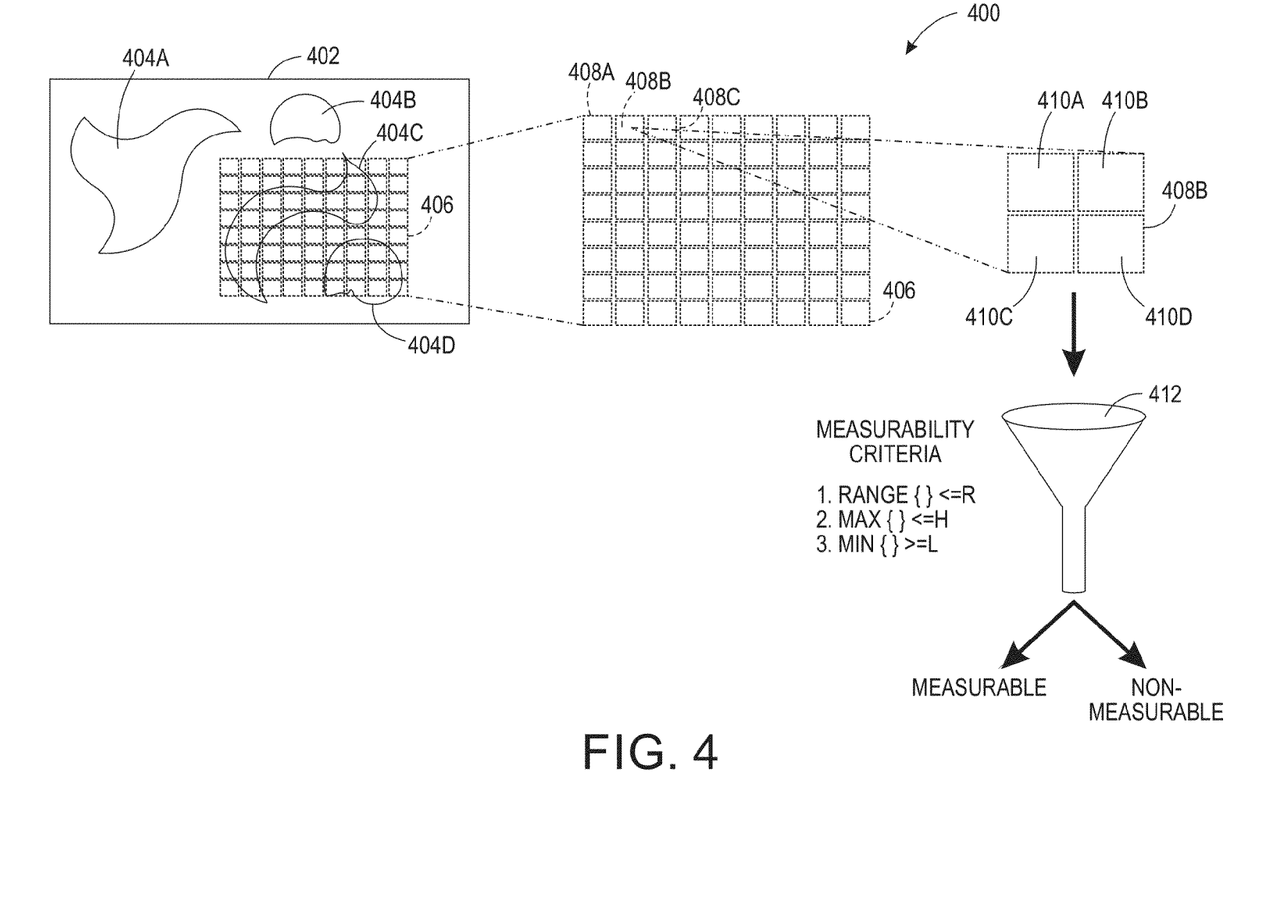
FIG. 4 is a flow diagram illustrating a method for image processing, in accordance with at least one embodiment.

FIG. 4 is a flow diagram 400 illustrating a method for image processing, in accordance with at least one embodiment. FIG. 4 is described in conjunction with FIG. 3.

As shown in FIG. 4, an image that is to be processed has been depicted by 402. The image 402 includes various image objects such as 404A, 404B, 404C, and 404D. As explained above (refer to step 302), the various image objects may be identified in the image 402 by utilizing one or more image processing techniques such as, but not limited to, connected component analysis or windowing-based feature extraction. In an embodiment, the user may select a portion 406 in the image for further processing. For instance, as shown in FIG. 4, the user selects the portion 406 that includes two objects 400c and 404d.

Further, the portion of the image 406 is divided into a set of blocks (as discussed in step 304). For instance, as shown in FIG. 4, the set of blocks includes 72 blocks including a block 408A, a block 408B, a block 408C, and so on. Further, each block in the set of blocks 406 is divided into a set of sub-blocks. For example, the block 408B is divided into four sub-blocks including a sub-block 410A, a sub-block 410B, a sub-block 410C, and a sub-block 410D.

As explained in conjunction with FIG. 3, for each of the sub-blocks (i.e., the sub-block 410A, the sub-block 410B, the sub-block 410C, and the sub-block 410D), an average pixel value (as discussed in step 306) is determined based on the pixel values of the pixels encompassed in each of the sub-blocks. For example, the block 408B (and each of the blocks in the portion of the image such as 408A, 408C, and so on) is of the dimension 32×32 pixels. Each sub-block within the block 408B (i.e., 410A, 410B, 410C, and 410D) would be of the dimension 16×16 pixels. Thus, to evaluate the block 408B for measurability, an average pixel value of each sub-block (410A, 410B, 410C, and 410D) is determined. For instance, an average of the 256 pixels within the sub-block 410A is determined as the average pixel value for the sub-block 410A, and so on for the rest of the blocks. As explained earlier, any known statistical technique may be utilized to determine the average without departing from the scope of the disclosure. Denoting the average pixel values as $Avg(SB_{410A})$, $Avg(SB_{410B})$, $Avg(SB_{410C})$, and $Avg(SB_{410D})$ for the sub-blocks 410A, 410B, 410C, and 410D, respectively.

Thereafter, as explained earlier (as discussed in step 308), a minimum average pixel value, a maximum average pixel value, and a range of pixel values is determined for the block 408B. For instance, in the above scenario, for the block 408B, denoting the minimum average pixel value, the maximum average pixel value, and the range of pixel values as $Min(B_{408B})$, $Max(B_{408B})$, and $Range(B_{408B})$, respectively, which may be determined using equations 2, 3, and 4, respectively, based on the values of $Avg(SB_{410A})$, $Avg(SB_{410B})$, $Avg(SB_{410C})$, and $Avg(SB_{410D})$, each of which may be determined using equation 1. The measurability criteria (denoted by 412) is evaluated based on the values of $Range(B_{408B})$, $Max(B_{408B})$, and $Min(B_{408B})$. For the block 408B to be measurable, $Range(B_{408B})$ and $Max(B_{408B})$ should be less than or equal to the parameters 'R' and 'H' respectively, and $Min(B_{408B})$ should be greater than or equal to the parameter 'L' (as discussed in step 310). As already explained, the parameters 'R', 'H', and 'L' may either be provided as user-inputs or may correspond to programmable parameters. Further, as explained earlier, the measurability criteria may be modifiable by a user for processing of different portion of the image 402.

Figure 5:
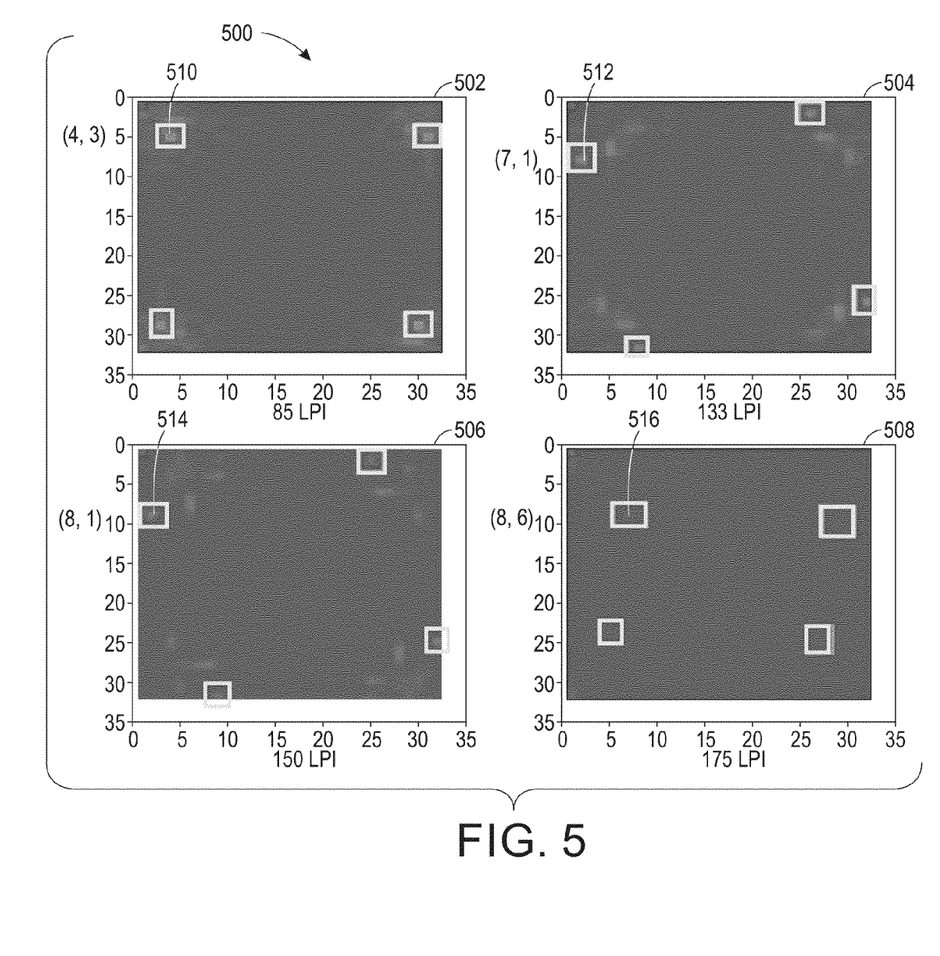
FIG. 5 illustrates a block diagram of frequency domain plots for estimating half-tone frequency of the portion of image, in accordance with at least one embodiment.

FIG. 5 illustrates a block diagram 500 of frequency domain plots for estimating half-tone frequency of the portion of image, in accordance with at least one embodiment.

As shown in FIG. 5, frequency domain plots corresponding to four measurable blocks (say, blocks $B_1$, $B_2$, $B_3$, and $B_4$) have been depicted by graphs 502, 504, 506, and 508. The graph 502 of the frequency domain plot corresponding to the block $B_1$ includes four frequency peaks. Among the four frequency domain peaks, the frequency peak located at the point (4, 3) may correspond to the highest frequency domain peak (depicted by 510). Further, the location of this peak point, i.e., (4, 3), may correspond to a half-tone frequency value (referring table 2) of 85 LPI (if the image is a color image) and 100 LPI (if the image is a gray scale image).

Further, as shown in FIG. 5, the graph 504, corresponding to the frequency domain plot for the block $B_2$ also includes four frequency peaks with the highest peak among them located at the point (7, 1) (depicted by 512). Referring to Table 2, the half-tone frequency value corresponding to this peak location, i.e., (7, 1) is 133 LPI (for color/gray scale images).

Similarly, as shown in FIG. 5, graphs 506 and 508 correspond to the frequency domain plots for the blocks $B_3$ and $B_4$, respectively. As depicted in FIG. 5, the highest frequency peaks for the blocks $B_3$ and $B_4$ are located at the points (8, 1) and (8, 6), respectively, (depicted by 514 and 516). Again, referring to Table 2, the half-tone frequency of blocks $B_3$ and $B_4$ may 150 LPI and 175 LPI, respectively (considering the image as a color image).

The disclosed embodiments encompass numerous advantages. As discussed in various embodiments of the disclosure, each block in the portion of the image is analyzed against a measurability criteria. Only the block that satisfies the measurability criteria is selected for estimation of half-tone frequency of the portion. In this way, the measurability criteria filters out blocks on the basis of the constituent pixels of each block being within one or more threshold pixel values, governed by the programmable parameters such as H, L, and R (corresponding to the average maximum pixel value, the average minimum pixel value, and the range of pixel values). Thus, such filtering of blocks may lead to a removal of image regions corresponding to un-even transitions (i.e., edges/contours) and extreme pixel values (i.e., black/white noise), and may enhance the accuracy of estimation of half-tone frequency of the region of interest bounded within the portion of image.

Further, the disclosure provides a parallelizable method of estimation of the half-tone frequency. The process of evaluation of measurability criteria may be applied on a first set of blocks belonging to a first image portion by a first processor, while the process of estimation of the half-tone frequency of a second set of blocks belonging to a second image portion may be performed by a second processor. Such parallel processing may lead to a reduction of processing time while processing the image for determination of halftone frequencies.

The disclosed methods and systems, as illustrated in the ongoing description or any of its components, may be embodied in the form of a computer system. Typical examples of a computer system include a general-purpose computer, a programmed microprocessor, a micro-controller, a peripheral integrated circuit element, and other devices, or arrangements of devices that are capable of implementing the steps that constitute the method of the disclosure.

The computer system comprises a computer, an input device, a display unit, and the internet. The computer further comprises a microprocessor. The microprocessor is connected to a communication bus. The computer also includes a memory. The memory may be RAM or ROM. The computer system further comprises a storage device, which may be a HDD or a removable storage drive such as a floppy-disk drive, an optical-disk drive, and the like. The storage device may also be a means for loading computer programs or other instructions onto the computer system. The computer system also includes a communication unit. The communication unit allows the computer to connect to other databases and the internet through an input/output (I/O) interface, allowing the transfer as well as reception of data from other sources. The communication unit may include a modem, an Ethernet card, or other similar devices that enable the computer system to connect to databases and networks, such as, LAN, MAN, WAN, and the internet. The computer system facilitates input from a user through input devices accessible to the system through the I/O interface.

To process input data, the computer system executes a set of instructions stored in one or more storage elements. The storage elements may also hold data or other information, as desired. The storage element may be in the form of an information source or a physical memory element present in the processing machine.

The programmable or computer-readable instructions may include various commands that instruct the processing machine to perform specific tasks, such as steps that constitute the method of the disclosure. The systems and methods described can also be implemented using only software programming or only hardware, or using a varying combination of the two techniques. The disclosure is independent of the programming language and the operating system used in the computers. The instructions for the disclosure can be written in all programming languages, including, but not limited to, 'C', 'C++', 'Visual C++' and 'Visual Basic'. Further, software may be in the form of a collection of separate programs, a program module containing a larger program, or a portion of a program module, as discussed in the ongoing description. The software may also include modular programming in the form of object-oriented programming. The processing of input data by the processing machine may be in response to user commands, the results of previous processing, or from a request made by another processing machine. The disclosure can also be implemented in various operating systems and platforms, including, but not limited to, 'Unix', 'DOS', 'Android', 'Symbian', and 'Linux'.

The programmable instructions can be stored and transmitted on a computer-readable medium. The disclosure can also be embodied in a computer program product comprising a computer-readable medium, or with any product capable of implementing the above methods and systems, or the numerous possible variations thereof.

Various embodiments of the methods and systems for image processing have been disclosed. However, it should be apparent to those skilled in the art that modifications in addition to those described are possible without departing from the inventive concepts herein. The embodiments, therefore, are not restrictive, except in the spirit of the disclosure. Moreover, in interpreting the disclosure, all terms should be understood in the broadest possible manner consistent with the context. In particular, the terms "comprises" and "comprising" should be interpreted as referring to elements, components, or steps, in a non-exclusive manner, indicating that the referenced elements, components, or steps may be present, or used, or combined with other elements, components, or steps that are not expressly referenced.

A person with ordinary skills in the art will appreciate that the systems, modules, and sub-modules have been illustrated and explained to serve as examples and should not be considered limiting in any manner. It will be further appreciated that the variants of the above disclosed system elements, modules, and other features and functions, or alternatives thereof, may be combined to create other different systems or applications.

Those skilled in the art will appreciate that any of the aforementioned steps and/or system modules may be suitably replaced, reordered, or removed, and additional steps and/or system modules may be inserted, depending on the needs of a particular application. In addition, the systems of the aforementioned embodiments may be implemented using a wide variety of suitable processes and system modules, and are not limited to any particular computer hardware, software, middleware, firmware, microcode, and the like.

The claims can encompass embodiments for hardware and software, or a combination thereof.

It will be appreciated that variants of the above disclosed, and other features and functions or alternatives thereof, may be combined into many other different systems or applications. Presently unforeseen or unanticipated alternatives, modifications, variations, or improvements therein may be subsequently made by those skilled in the art, which are also intended to be encompassed by the following claims.

What is claimed is:

1. A method for image processing, the method comprising:
   dividing, by one or more processors, a portion of an image into a set of blocks, wherein each block in the set of blocks is divided into a set of sub-blocks;
   identifying, by the one or more processors, a measurable block, from the set of blocks, based on a measurability criteria, wherein the measurability criteria comprises:
   determining, by the one or more processors, an average pixel value for each of the sub-blocks based on one or more pixels encompassed by respective sub-block,
   determining, by the one or more processors, a maximum average pixel value among the set of sub-blocks, a minimum average pixel value among the set of sub-blocks, and a range of average pixel values among the set of sub-blocks, based on the average pixel value for each of the sub-blocks,
   comparing, by the one or more processors, the maximum average pixel value, the minimum average pixel value, and the range of average pixel values with respective pre-determined thresholds; and estimating, by the one or more processors, a half-tone frequency of the portion based on a processing of the identified measurable block.

2. The method of claim 1, wherein the processing corresponds to a spatial-to-frequency domain transform on the identified measurable block.

3. The method of claim 2, wherein the half-tone frequency of the identified measurable block is estimated based on a location of a frequency domain peak value of the identified measurable block.

4. The method of claim 3, wherein the half-tone frequency of the portion is estimated based on a frequency domain peak value of a first pre-determined number of measurable blocks in vicinity of the identified measurable block.

5. The method of claim 3, wherein the half-tone frequency of the portion is estimated based on an average of the half-tone frequency estimated for a second pre-determined number of measurable blocks from the set of blocks.

6. The method of claim 2, wherein the spatial-to-frequency domain transform corresponds to a Fast Fourier Transform (FFT).

7. A system for image processing, the system comprising:
one or more processors configured to:
divide a portion of an image into a set of blocks, wherein each block in the set of blocks is divided into a set of sub-blocks;
identify a measurable block, from the set of blocks, based on a measurability criteria, wherein the measurability criteria comprises:
determining an average pixel value for each of the sub-blocks based on one or more pixels encompassed by respective sub-block,
determining a maximum average pixel value among the set of sub-blocks, a minimum average pixel value among the set of sub-blocks, and a range of average pixel values among the set of sub-blocks, based on the average pixel value for each of the sub-blocks,
comparing the maximum average pixel value, the minimum average pixel value, and the range of average pixel values with respective pre-determined thresholds; and
estimate a half-tone frequency of the portion based on a processing of the identified measurable block.

8. The system of claim 7, wherein the processing corresponds to a spatial-to-frequency domain transform on the identified measurable block.

9. The system of claim 8, wherein the half-tone frequency of the identified measurable block is estimated based on a location of a frequency domain peak value of the identified measurable block.

10. The system of claim 9, wherein the half-tone frequency of the portion is estimated based on locations of frequency domain peak values of a first pre-determined number of measurable blocks in vicinity of the identified measurable block.

11. The system of claim 9, wherein the half-tone frequency of the portion is estimated based on an average of the half-tone frequency estimated for a second pre-determined number of measurable blocks from the set of blocks.

12. The system of claim 8, wherein the spatial-to-frequency domain transform corresponds to a Fast Fourier Transform (FFT).

13. A computer program product for use with a computer, the computer program product comprising a non-transitory computer readable medium, wherein the non-transitory computer readable medium stores a computer program code for image processing, wherein the computer program code is executable by one or more processors to:
divide a portion of an image into a set of blocks, wherein each block in the set of blocks is divided into a set of sub-blocks;
identify a measurable block, from the set of blocks, based on a measurability criteria, wherein the measurability criteria comprises:
determining an average pixel value for each of the sub-blocks based on one or more pixels encompassed by respective sub-block,
determining a maximum average pixel value among the set of sub-blocks, a minimum average pixel value among the set of sub-blocks, and a range of average pixel values among the set of sub-blocks, based on the average pixel value for each of the sub-blocks,
comparing the maximum average pixel value, the minimum average pixel value, and the range of average pixel values with respective pre-determined thresholds; and
estimate a half-tone frequency of the portion based on a processing of the identified measurable block.

14. The computer program product of claim 13, wherein the processing corresponds to a spatial-to-frequency domain transform on the identified measurable block.

15. The computer program product of claim 14, wherein the half-tone frequency of the identified measurable block is estimated based on a location of a frequency domain peak value of the identified measurable block.

16. The computer program product of claim 15, wherein the half-tone frequency of the portion is estimated based on a frequency domain peak value of a first pre-determined number of measurable blocks in vicinity of the identified measurable block.

17. The computer program product of claim 15, wherein the half-tone frequency of the portion is estimated based on an average of the half-tone frequency estimated for a second pre-determined number of measurable blocks from the set of blocks.

18. The computer program product of claim 14, wherein the spatial-to-frequency domain transform corresponds to a Fast Fourier Transform (FFT).

* * * * *